(12) United States Patent
Qiu et al.

(10) Patent No.: US 8,792,910 B2
(45) Date of Patent: Jul. 29, 2014

(54) METHOD AND ARRANGEMENT TO MONITOR DISTANCES AMONG A GROUP OF ELECTRONIC COMMUNICATION DEVICES

(75) Inventors: Kermit Qiu, Guangzhou (CN); Bjorn Andersson, Guang Zhou (CN); Vitomir Ilic, Hägersten (SE); Johan Bolin, Spanga (SE); Ake Busin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1025 days.

(21) Appl. No.: 12/604,912

(22) Filed: Oct. 23, 2009

(65) Prior Publication Data

US 2011/0098059 A1   Apr. 28, 2011

(51) Int. Cl.

| | | |
|---|---|---|
| H04W 24/00 | (2009.01) | |
| H04W 28/02 | (2009.01) | |
| H04W 64/00 | (2009.01) | |
| H04W 48/16 | (2009.01) | |
| H04W 36/06 | (2009.01) | |
| H04W 48/18 | (2009.01) | |
| H04W 74/00 | (2009.01) | |
| H04L 5/00 | (2006.01) | |
| H04L 29/06 | (2006.01) | |
| H04B 17/00 | (2006.01) | |
| G01S 5/00 | (2006.01) | |
| G01S 5/02 | (2010.01) | |
| H04M 15/00 | (2006.01) | |

(52) U.S. Cl.
CPC ............. *H04W 28/02* (2013.01); *H04W 64/00* (2013.01); *H04W 48/16* (2013.01); *H04W 36/06* (2013.01); *H04W 48/18* (2013.01); *H04W 74/006* (2013.01); *Y02B 60/50* (2013.01); *H04L 5/006* (2013.01); *H04L 63/10* (2013.01); *H04B 17/0057* (2013.01); *G01S 5/0036* (2013.01); *G01S 5/0205* (2013.01); *H04M 15/8016* (2013.01); *H04M 2215/7414* (2013.01)
USPC ............. 455/456.2; 455/414.2; 455/404.2; 455/456.1; 455/456.5; 455/456.6; 455/457; 455/440; 701/32.3; 701/469; 701/470

(58) Field of Classification Search
CPC ..... H04W 24/02; H04W 64/00; H04W 48/16; H04W 24/00; H04W 60/00; H04W 36/14; H04W 72/02; H04W 48/14; H04W 28/08; H04W 74/006; H04W 36/165; H04W 72/00; H04W 28/0289; H04W 24/06; Y02B 60/50; H04L 5/006; H04L 5/0073; H04L 63/10; H04L 67/1031; H04L 47/10; H04L 43/0811; H04L 67/306; H04B 17/0057; H04B 7/02; H04B 17/0072; H04B 17/0077; G01S 5/0036; G01S 5/0205; G01S 19/42; G01S 5/0236; G01S 5/10; H04M 15/8011; H04M 15/8016; H04M 15/8033; H04M 1/72572; H04M 2215/7414; H04M 2215/7435; H04M 2242/31
USPC .............. 455/404.2, 414.2, 440, 456.1, 456.2, 455/456.3, 456.5, 456.6, 457; 701/32.3, 701/469, 470
See application file for complete search history.

(56) References Cited

U.S. PATENT DOCUMENTS

2007/0249347 A1 * 10/2007 Saifullah et al. ............. 455/436
2009/0322603 A1 * 12/2009 Liao ........................ 342/357.12

*Primary Examiner* — Nimesh Patel (57) ABSTRACT

A method and service-related nodes for providing a deferred distance notification for at least two user devices. A Location-based gateway receives a request for a deferred distance notification for user devices, and sends a request to a Location enabler for the location of the user devices. The gateway receives location data from the Location enabler, and monitors the fulfillment of user device distance-related event criteria. When a user device distance-related event criterion is fulfilled, the gateway triggers the deferred distance notification, and sends the notification of the user device distance event to an application node. The application node sends a location request after which the Application node receives the notification. Distance notification can thus be provided to a user requesting a location-deferred service, such that the location of entire groups of users can be revealed to the requesting party.

6 Claims, 7 Drawing Sheets

METHOD AND ARRANGEMENT TO MONITOR DISTANCES AMONG A GROUP OF ELECTRONIC COMMUNICATION DEVICES

BACKGROUND

The present invention relates to telecommunication systems. More particularly, and not by way of limitation, the present invention is directed to a method and arrangement for monitoring distances among a group of electronic communication devices.

Services that are based on a location, for instance the location of a mobile phone, have recently become more and more popular.

Figure 1:
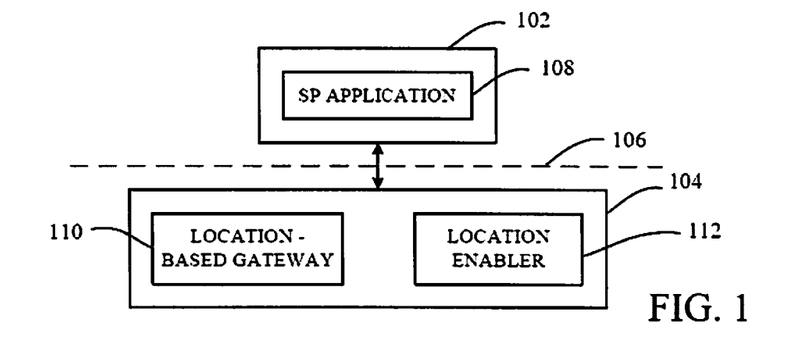
FIG. 1 illustrates a communication system over a standardized interface according to prior art.

FIG. 1 illustrates a schematic presentation of a communication system comprising a Service Provider (SP) 102 communicating with an Operator 104 over a standardized interface 106. An application 108 at the SP can provide a so called location-based service to a user based on the location of the user. The Operator 104 can include a Location-based Gateway 110 and a Location Enabler 112, which is an entity that can provide the location of the device in point. The Application 108 and the Location-based Gateway 110 may be implemented over a standardized interface as defined by specifications such as Parlay X, Mobile Location Protocol (MLP) etc.

Currently, these standardized specifications comprise three kinds of location-based services:
Get Location: A service for requesting the location of a terminal or a group of terminals;
Notification: A service for raising a notification to a user when a target terminal is entering or leaving a defined location area, or for raising a notification reporting the location of target terminal periodically; and
Get Distance: A service for requesting the distance from a mobile terminal to a fixed location from a service provider.

The currently existing services are all based on the location of a mobile terminal. They can hence provide information or a notification based on the location of the mobile terminal. It is however a drawback that these existing services are limited to services, which are based on the location of the terminal. Sometimes, there is a demand to base a service on another parameter than the location.

A user may wish to receive information how far it is to one or more friends, colleagues or relatives. Also, a user could appreciate information about whether a group of users have passed a border by either approaching or leaving a neighborhood.

SUMMARY

There is a need to provide notification functionality based on location-related parameters other than the location itself.

It is an object of the present invention to provide a distance notification service-related to a group of electronic communication devices.

According to an embodiment of the present invention, there is provided a method in a first service-related node for providing a deferred distance notification for at least two user devices. The method comprises receiving from a second service-related node a request for a deferred distance notification for the at least two user devices, wherein the request comprises user device identification data for the at least two user devices and a plurality of distance criteria related to the at least two user devices. It comprises further sending to a third service-related node a request for the location of the at least two user devices and receiving from the third service-related node location data of the at least two user devices. Thereafter monitoring the fulfillment of user device distance-related event criteria is performed, followed by triggering the deferred distance notification when a user device distance-related event criterion is fulfilled, and sending the triggered deferred distance notification of the user device distance event to the second service node.

According to another embodiment of the present invention, there is provided a method in a second service-related node for requesting a deferred distance notification of at least two user devices. A request for a deferred distance notification for the at least two user devices, is sent to a first service-related node, where the request comprises user device identification data for the at least two user devices. A deferred distance notification for the at least two user devices, is received from the first service node, when a user device distance-related event criterion is fulfilled.

According to another embodiment of the present invention, there is provided a method in a third service-related node for providing location data related to at least one user. A request for the location of at least two user devices is received from a first service-related node and the location of the at least two user devices is obtained. Thereafter, location data of the at least two user devices is sent to the first service-related node.

According to yet another embodiment of the present invention, there is provided a first service-related node for providing a deferred distance notification for at least two user devices. The first service-related node is conFigured to be connected to a second and a third service-related node and comprises a transceiving unit, a processing unit and a triggering unit. The transceiving unit is conFigured to receive a request for a deferred distance notification for the at least two user devices from a second service-related node, wherein the request comprises user device identification data for the at least two user devices and a plurality of user device distance-related event criteria of the at least two user devices. The transceiving unit is also conFigured to send to a third service-related node a request for the location of the at least two user devices, and to receive from the third service-related node location data of the at least two user devices. The processing unit is conFigured to be connected to the transceiving unit, and comprises a monitoring unit that is conFigured to monitor the fulfillment of user device distance-related event criteria. The triggering unit is conFigured to be connected to the processing unit and the transceiving unit, and is further conFigured to trigger the deferred distance notification when the user device distance-related event criterion is fulfilled. In addition, the transceiving unit is also conFigured to send the triggered deferred distance notification to the second service node.

According to yet another aspect of the present invention there is provided a second service-related node for requesting a deferred distance notification of at least two user devices, which second service-related node is conFigured to be connected to a first service-related node.

The second service-related node comprises a transceiving unit and a processing unit, wherein the transceiving unit is conFigured to send to a request for a deferred distance notification for the at least two user devices to the first service-related node. The request comprises user device identification data for the at least two user devices. The transceiving unit is also conFigured to receive from the first service node the deferred distance notification for the at least two user devices, when a user device distance-related event criterion is fulfilled. The processing unit is conFigured to be connected to the transceiving unit and conFigured to initialize the request for the deferred distance notification and to initialize a request to end the deferred distance notification.

According to still yet another aspect of the present invention, there is provided a third service-related node for providing location data related to at least one user, wherein the third service-related node is conFigured to be connected to a first service-related node.

The third service-related node being conFigured to be connected to a first service-related node, comprises a transceiving unit and a location obtaining unit. The transceiving unit is conFigured to receive a request for the location of the at least two user devices from the first service-related node. The location obtaining unit is conFigured to be connected to the transceiving unit, and to obtain the location of the at least two user devices. In addition, the transceiving unit is also conFigured to send to the first service-related node the location data of the at least two user devices as obtained from the location obtaining unit.

At least some embodiments of the present invention circumvent the drawback of existing services being limited to services that are based on the location of the terminal.

It is further advantageous that distance based notification can now be provided to a user by which the user can receive information how far it is to one or more friends, colleagues or relatives.

Likewise, it is appreciated by a user to receive information in the form of a notification informing him that a group of users or friends have passed a border by either approaching or leaving a referenced user or friend.

The following definitions are applicable:
All within distance: All monitored devices within the distance limit of at least one reference device.
Any within distance: At least one monitored device within the distance limit of at least one reference device.
All beyond distance: All monitored devices beyond the distance limit of all reference devices.
Any beyond distance: At least one monitored device beyond the distance limit of all reference devices.

BRIEF DESCRIPTION OF THE DRAWINGS

In order to explain advantages and features of the present invention herein in more detail a few embodiments will be described below, where references are made to the accompanying drawings, for which.

The following abbreviations are applicable:
AN Application Node
GMLC Gateway Mobile Location Center
LCS LoCation Service
LDR Location Deferred Request
MLP Mobile Location Protocol
OMA Open Mobile Alliance
QoS Quality of Service
SP Service Provider
UE User Equipment
URI Uniform Resource Identifier

| AN | Application Node |
| GMLC | Gateway Mobile Location Center |
| LCS | LoCation Service |
| LDR | Location Deferred Request |
| MLP | Mobile Location Protocol |
| OMA | Open Mobile Alliance |
| QoS | Quality of Service |
| SP | Service Provider |
| UE | User Equipment |
| URI | Uniform Resource Identifier |

DETAILED DESCRIPTION

As was mentioned in the background section, the existing services as described above can be based on the location of a user's mobile terminal. Location-based services can thus be provided. However, there are many location-based applications that would benefit from having a notification service that is distance-based rather than location-based. One example of such an application is one that provides a notification when a distance from a device A to a device B fulfills a distance criterion. This is different from providing a notification when device A is within a certain region in general.

The currently available location-based services as implemented by the current location-based specifications do however not support a notification based on a distance, for example the distance between device A and device B. There is hence a demand for a distance notification service as this is required by more and more user applications.

Figure 2:
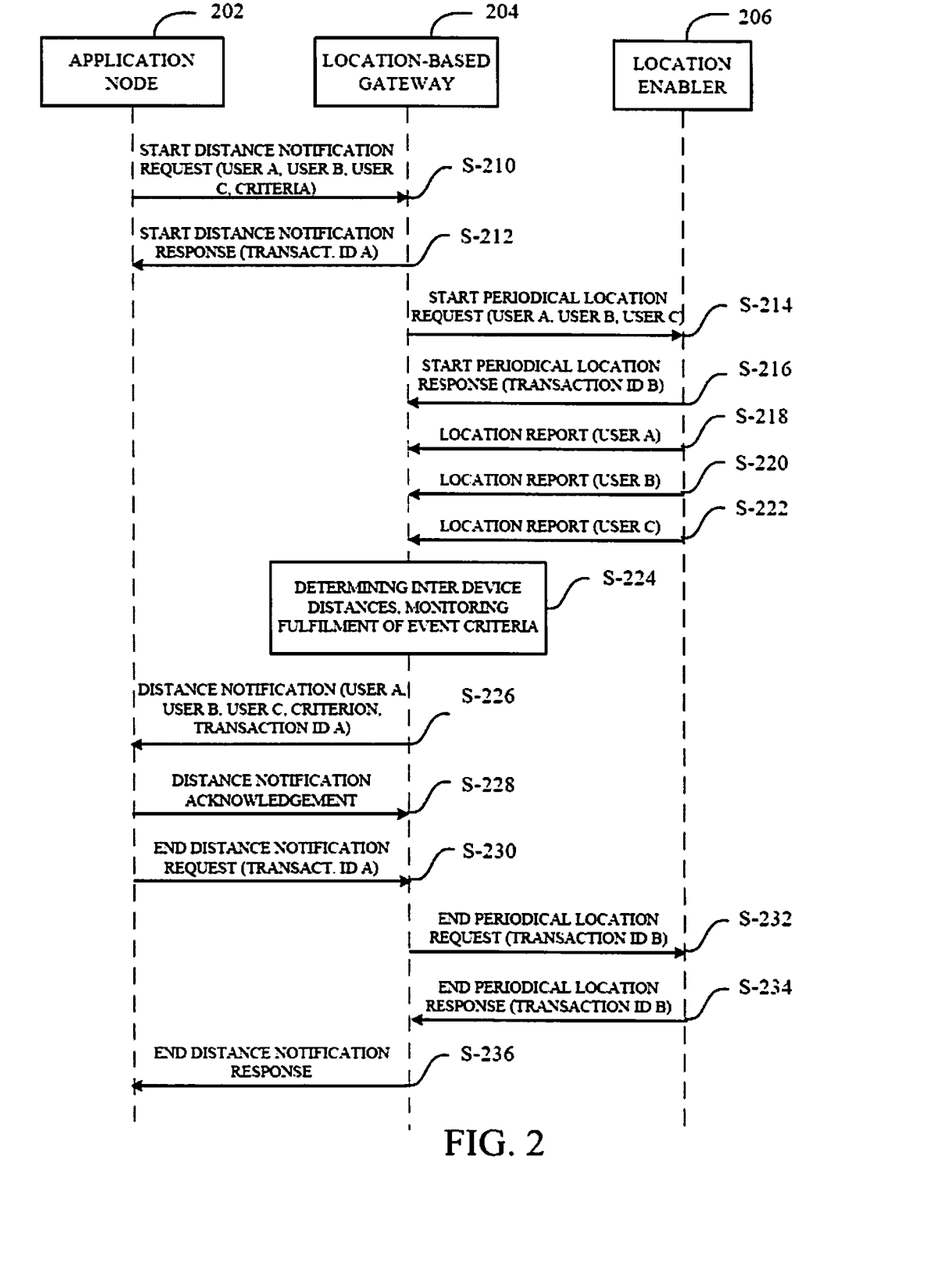
FIG. 2 illustrates a signal diagram relevant to some embodiments of the present invention.

In order to present at least some embodiments of the current invention, FIG. 2 illustrates a signal diagram of signaling between an Application node 202, a Location-based gateway 204 and a Location enabler 206, presenting an overview of possible communication between the nodes.

In order to start the location service the Application node 202 may send a Start distance notification request to the Location-based Gateway 204, step S-210. This request typically identifies the users or their portable communication devices, such as their mobile terminals. User A, user B and user C, can thus be identified as well as one or more distance criteria that are monitored to detect as to whether they are fulfilled or not. As a response to the Start distance notification request, the Location-based Gateway 204 can send a Start distance notification response, S-212, to the Application node 202, which response can comprise a first transaction identity (ID), ID A. This first transaction ID, ID A is defined by the Location-based gateway to connect the users, and the criteria to the sent request. As we shall see later it can be used by the Application Node 202 to connect a certain received Distance notification to the corresponding Start distance notification request, as requested in step S-210.

Based on the received Start distance notification request in step S-210, the Location-based Gateway 204 may then send a Start periodical location request, S-214, to the Location Enabler 206, which request again comprises the identity of the users or their portable communication devices. The Location-based gateway 204 can hereby request the Location Enabler 206 to periodically provide location data of the identified users. Having received the Start periodical location request in step S-214, the Location Enabler 206 can send a Start periodical location response to the Location-based Gateway 204, which response can comprise a second transaction identity. This second ID, ID B can be used to address the Start periodical location request by the Location-based gateway 204 in communication with the Location Enabler 206, down below.

The Location Enabler 206 can then periodically send a location report for each one of the users, for instance for user A in step S-218, for user B in step S-220 and for user C in step S-222.

Having access to the reported locations of users A, B and C, the Location-based gateway 204 can then determine the pair-wise distance between the user A, user B and user C, or alternatively between any reference devices and specified user devices, step S-224. The Location-based Gateway 204 can thereafter monitor whether the event criterion as provided in step S-210 is fulfilled or not, for each periodically received location report. The Location-based Gateway 204 can thus monitor fulfillment of provided event criteria.

It should be mentioned that if the Location-based gateway 204 can determine that a distance event criteria is fulfilled already when the distance notification is requested, the Location-based gateway can provide a distance notification to the Application node 202 already at this stage. The Location-base gateway may use periodical notification to the GMLC for further provision to the Application node 202. It would thus not be necessary to await a fulfillment of a distance event criterion from distance data of the periodical location reports S-218-222 from the Location Enabler 206 before a distance notification is reported to the Application node 202. A distance evaluation can thus be made immediately after the distance notification is set up, after receipt of the start distance notification request, in step S-210.

Regarding the fulfillment of distance-related event criterion, this implies that the monitored terminal devices and the reference devices have preferably entered a distance state that fulfills the distance-related event criterion. A static fulfillment of a distance event criterion may be set to provide a multitude of continuous distance notifications to the Application node 202 by omitting a duration parameter in the Parlay X implementation, as described below. However, the default setting of zero enables the service policy to control the duration during which the distance notification is silent after having notified a fulfillment of a distance-related event criterion.

Returning to flow-chart of FIG. 2, if an event criterion is fulfilled, the Location-based gateway 204 sends a Distance notification to the Application node 202, in step S-226. Such a distance notification can comprise the identity of the users or their mobile terminals, the criterion that was fulfilled and the first transaction ID, ID A. This distance notification may also comprise the distance from UE identities to referenced identities, or the distance between UE identities, to mention two possible examples only. The distance to one or more friends, colleagues or relatives may thus also be provided in the distance notification.

If the criterion is not fulfilled, no distance notification will be sent and further location reports are received and related to the specified distance criteria.

Having received a distance notification in step S-226, the application node 202 can then identify the distance notification by using the first transaction ID, ID A and send a distance notification acknowledgement in step S-228, to the Location-based gateway 204.

Thereafter the Application node 202 may send a request to terminate the notification service in an End distance notification request in step S-230 comprising the first transaction ID, ID A to the Location-based gateway 204. The Location-based gateway 204 can transfer the end request to the Location Enabler 206 in an End periodical location request in step S-232, which request can comprise the second transaction ID, ID B enabling the Location Enabler 206 to identify the on-going requested location service to terminate. After the Location Enabler 206 has ended the periodical location request, the Location Enabler 206 can send an End periodical location response to the Location-based gateway 204, again comprising the second transaction ID, ID B. Eventually, the Location-based Gateway 204 can send an End distance notification response in step S-236 to the Application node 202, confirming the termination of the distance notification service.

Having illustrated the overall signaling steps in FIG. 2 according to at least some embodiment of the present invention, individual method steps in separate service-related nodes will now be described.

Figure 3:
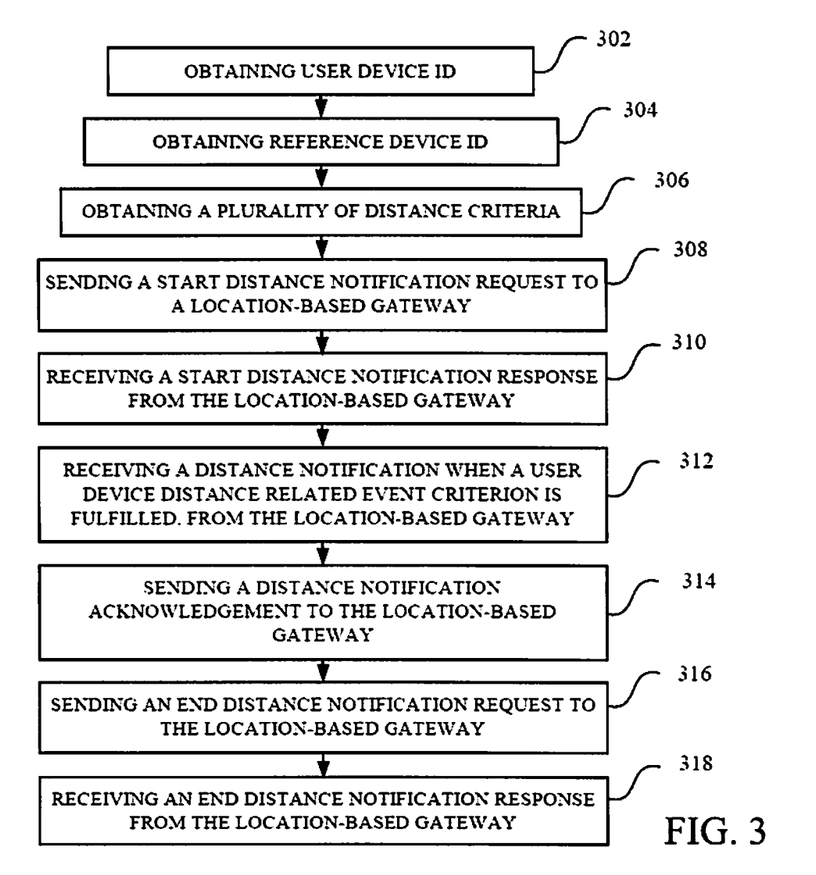
FIGS. 3, 4 and 5 each illustrates a flow-chart of method steps according to some embodiments of the present invention.

FIG. 3 illustrates method steps that can be executed in an Application node 102, 202 for requesting a deferred distance notification according to some embodiments of the present invention. This method can start with step 302 in which the Application node 102, 202 obtains one or more user device identities. The Application node 102, 202 may also obtain one or several reference device identities, according to some embodiments, in step 304. In addition, the Application node can also obtain one or more distance criteria, in step 306. These criteria can define the distance limits which when a user device travels beyond or within, fulfils the criteria being event related.

Having obtained the user device ID, reference device ID and the distance criteria in step 302-306, the Application node 102, 202 can now send a Start distance notification request to the Location-based gateway 110, 204, in step 308. This request may comprise user device ID, reference device ID and criteria, as earlier obtained above in steps 302, 304 and 306. It should be noted that step 308 corresponds to step S-210 as of FIG. 2.

The Application node 102, 202 can then as a response to the Start distance notification request receive a Start distance notification response from the Location-based Gateway 110, 204, in step 310. A step is also illustrated as step S-212 in FIG. 2.

Upon fulfillment of an event criterion by the Location-based gateway 110, 204, the Application node 102, 202 can receive a distance notification in step 312. This is thus received when a user device distance-related event criterion that is related to a distance to the user device, is fulfilled. Step 312 as described here and as presented in FIG. 3 corresponds to step S-226 as of FIG. 2, as mentioned above.

After receiving the distance notification in step 312, the Application node 102, 202 may send a distance notification acknowledgement to the Location-based gateway 110, 204 in step 314. A correspondence can be found in step S-228 in FIG. 2.

Having received a distance notification and sent a distance notification acknowledgement, in steps 312 and 314, respectively, the application node 102, 202 may now send an End distance notification request to the Location-based gateway 110, 204, in step 316. This end distance notification request can comprise the first transaction ID, ID A enabling the Location-based gateway 110, 204 to match the End distance notification request with the distance notification service, as requested in step 308. Again, a correspondence can be found in step S-230 in the signal diagram of FIG. 2.

Subsequently, the Application node 102, 202 can receive an End distance notification response from the Location-based gateway 110, 204 in step 318, confirming the ended distance notification service, which step was indicated in FIG. 2 by step S-236.

Figure 4:
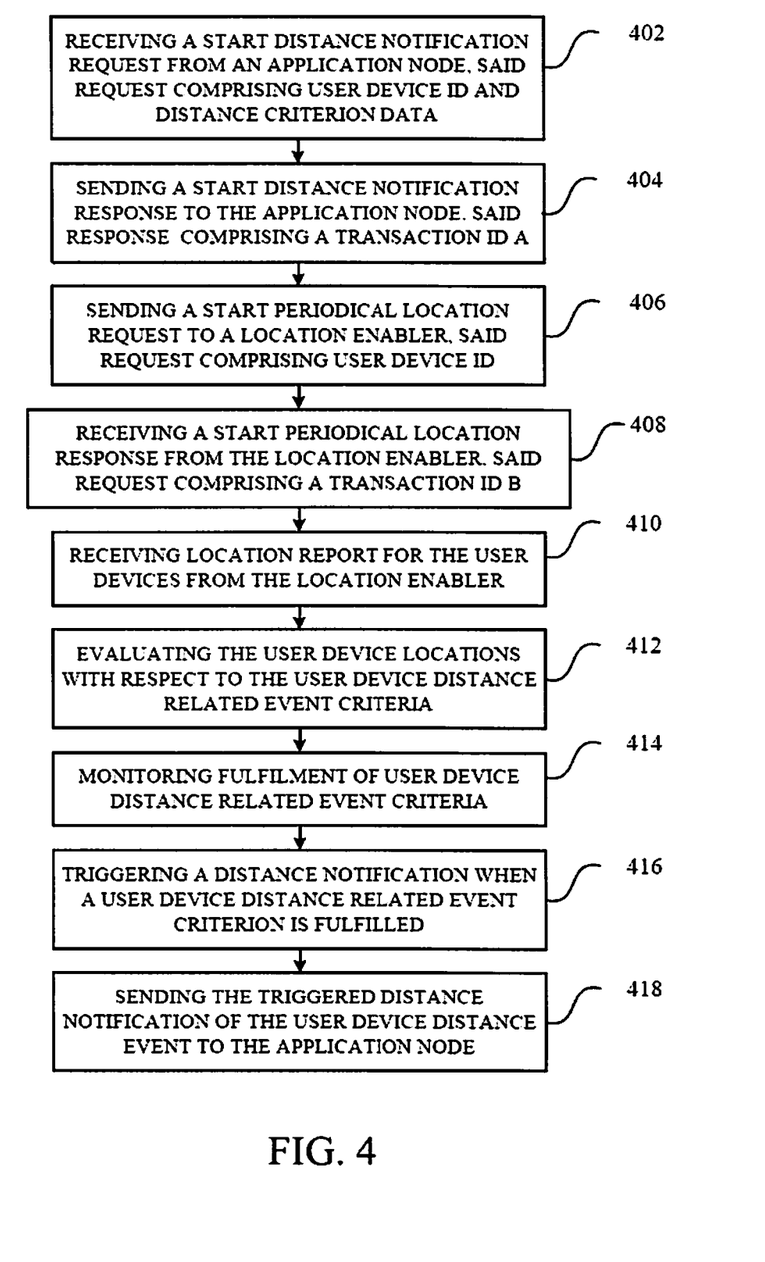

Method steps within the method for providing a deferred distance notification executable by the Location-based gateway 110, 204 will now be presented with reference to FIG. 4, according to some embodiments of the present invention. Reference will also be made to corresponding steps in either the signal diagram as of FIG. 2 or in the flow chart of FIG. 3, where appropriate.

The flow chart in FIG. 4 can start with step 402 in which the Location-based gateway 110, 204 can receive a Start distance notification request from the Application node 102, 202, where the request can comprise user device ID and data on distance criteria to be monitored for fulfillment. This step corresponds to step S-210 in FIG. 2 and step 310 in FIG. 3, as previously described.

The Location-based gateway 110, 204 can then send a Start distance notification response to the Application node 102, 202, comprising the first transaction ID, ID A identifying the request, in step 404. This step has a correspondence in step S-212 and in step 310, in FIGS. 2 and 3, respectively.

The following step may be to send a Start periodical location request, step 406, to the Location Enabler 112, 206, which request may comprise user device identities. This step has its similarity in the previously illustrated method step S-214 of FIG. 2. Having sent a Start periodical location request in step 406, the Location-based gateway 110, 204 can receive a Start periodical notification response from the Location-Enabler 112, 206 in step 408, corresponding to step S-216 in FIG. 2.

From the Location Enabler 112, 206, can the Location-based gateway 110, 204 receive a location report in step 410 for each one of the user devices as specified in the Start periodical location request in step 406. The provisioning of the location reports corresponds to steps S-218, S-220 and S-222 of FIG. 2.

Having received the location reports by the Location-based gateway 110, 204 for the user devices and optionally also for the reference devices, from the Location enabler 112, 206, the following step to be executed by the Location-based gateway 110, 204 can be step 412, evaluating the user device locations with respect to the user device distance-related event criteria. The distance from each user device to either other used devices or to one or more reference devices are calculated. The event criteria were provided to the Location-based gateway 110, 204 in step 402 by the Application node 102, 202. The user device locations are here transformed to inter device distances comparable to the event criteria. In step 414, the Location-based gateway 110, 204 can execute monitoring fulfillment of user device distance-related event criteria. It is here determined whether an event criterion is fulfilled or not, for each periodically provided location data. If the criterion is fulfilled, a distance notification can be triggered in step 416. Steps 412, 414 and 416 correspond to step S-224 in FIG. 2.

Having triggered the distance notification in step 416, the subsequent step can be sending the triggered distance notification of the user device distance-related event to the Application node 102, 202, in step 418. This step has its similarity in step S-226 of FIG. 2.

Figure 5:
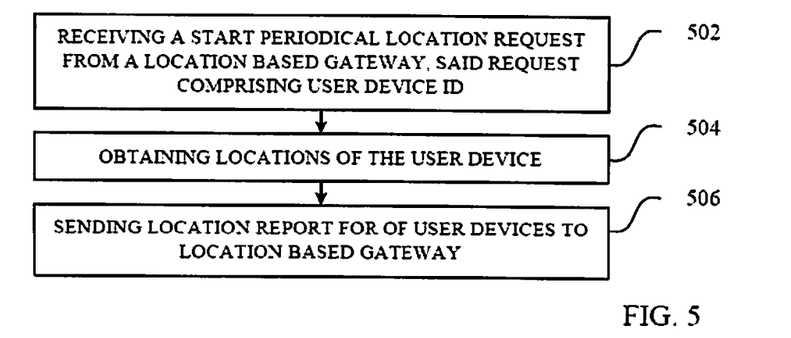

The corresponding method steps for providing location data related to at least one user, where the steps are executable by the Location Enabler 112, 206 will now be described with reference to FIG. 5, according to some embodiments of the present invention. This method can thus start with step 502 in which the Location-Enabler 112, 206 can receive a Start periodical location request from the Location-based gateway 110, 204. Again this corresponds to step S-214 in FIG. 2.

The Location enabler 112, 206 can then obtain the location of the user devices in step 504, as specified in the Start periodical location request in step 502. Having obtained the locations in step 504, the Location enabler 112, 206 can send Location reports for the user devices to the Location-based gateway 110, 204, in step 506 for subsequent evaluation. The correspondence to step 506 is thus found in steps S-218, S-220 and S-222, as presented in FIG. 2.

Inter-Device Distance Events:

The number of terminal devices that are monitored may vary from a single terminal device to a plurality of monitored devices. The number of reference devices from which the distances to each monitored terminal device is measured, can also vary. The number of reference devices can therefore be one or more, dependent of the specific case. In a certain case, these are no reference devices being defined. However, in this case pair-wise distances are measured between all terminal pairs. In practice this is synonymous with the case where all terminal devices are reference devices, since distances are measured from each one of the terminal devices to all other terminal devices.

Irrespective of the number of defined reference devices and the number of monitored terminal devices, one or more inter-device distances are determined. Based on the relation between determined inter-device distances and reference distance limits, a number of inter-device distance events can be identified.

In the following a few examples of inter-device distance events are illustrated in FIGS. 6A-D. These Figures comprise a reference device A and three terminal devices B, C and D. The reference device is marked with a triangle, whereas the each one of the three terminal devices B, C and D, is marked with a circle. The distances between the reference device A and each one of the terminal devices B, C and D, are marked with dAB, dAC and dAD, respectively. In addition, a reference distance limit of the reference device A is marked with dA.

All within Distance

Figures 6A, 6B:
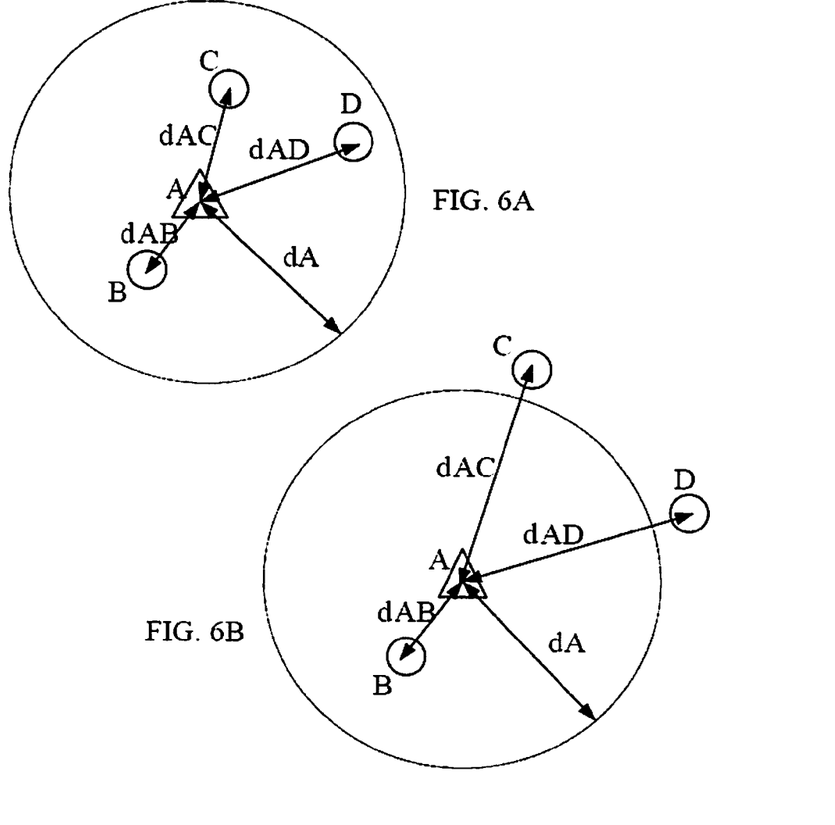
FIGS. 6A-D, 7A and 7B illustrate triggering events according to some embodiments of the present invention.

FIG. 6A illustrates an inter-device distance event called "all within distance". This event refers to the situation when the reported distance between the reference device A and each one of the monitored terminal devices B, C and D, that is dAB, dAC and dAD, has become smaller than the reference distance dA. This is synonymous with that all monitored terminal has come within the radial distance of dA from the reference device.

One illustrative example comprises providing a notification when a group gets ready. In a scenario wherein a teacher is leading a student group to outdoor activities, a notification is raised when all members have gathered and become ready, that is become closer to the teacher than a reference limit distance. Needless to say the teacher and each student carries a communication device, such as a mobile phone or the like.

When the distances dAB, dAC and dAD are reported to be shorter than dA the distance criterion for this inter-device distance event is fulfilled and a distance notification is sent.

The inter-device distance event is thus triggered when the distance event criterion is fulfilled. As will be further described hereinafter, the fulfillment of the distance event criterion is monitored to detect triggering of a distance notification when the criterion is fulfilled.

Any within Distance

FIG. 6B illustrates a further inter-device distance event "any within distance". This event refers to the situation when at least one of dAB, dAC and dAD becomes shorter than a reference distance dA.

In FIG. 6B it is shown that dAB has become shorter than dA, showing that the monitored device B has come closer than the distance dA, to the reference device A. The criterion of "any within distance" is thus fulfilled.

All Beyond Distance

Figure 6C:
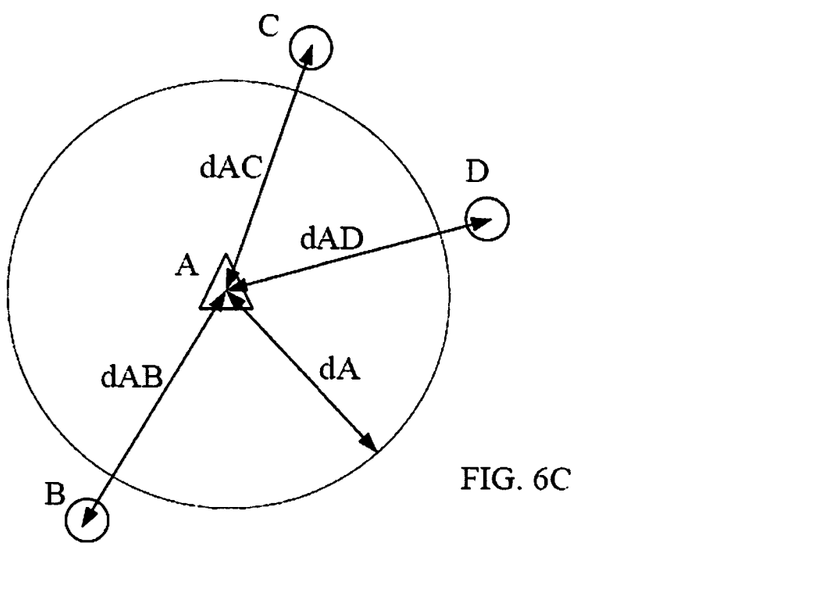

FIG. 6C illustrates the inter-device distance event "all beyond distance" that refers to the situation where all monitored terminal devices have traveled or in any other way become beyond the defined reference limit dA. An "all beyond distance" criterion is thus fulfilled when dAB, dAC and dAD are longer than the reference limit dA.

Any Beyond Distance

Figure 6D:
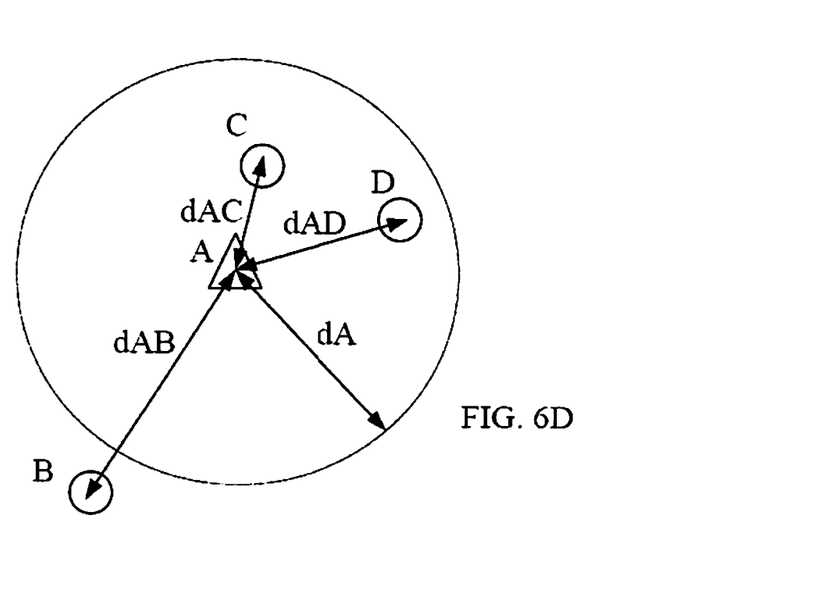

In FIG. 6D yet another event "any beyond distance" is illustrated. This situation refers to when at least one of the monitored terminal devices B, C and D has become beyond the reference distance dA in relation to the reference device A. When at least one of the reported distances dAB, dAC and dAD becomes longer than the reference distance limit dA, the "any beyond distance" criterion is fulfilled and a distance notification is triggered.

In FIG. 6D it is explicitly illustrated that dAB is longer than dA, fulfilling the distance criterion, whereafter a distance notification is triggered.

This can be exemplified with the case when a member of a group of members travels beyond the distance as specified by a notification request, after which a notification is provided to the part requesting the service. For instance, when a student travels beyond a border as defined by the specified distance limit, a notification is provided to the requesting part.

Reference Devices—Multiple or None

Above there were presented inter-device distance events with a singular reference device. However, if there is multiple reference devices present to which distances are reported, the corresponding distance-related criteria to be fulfilled for triggering a notification may involve more than one reference device.

Figure 7A:
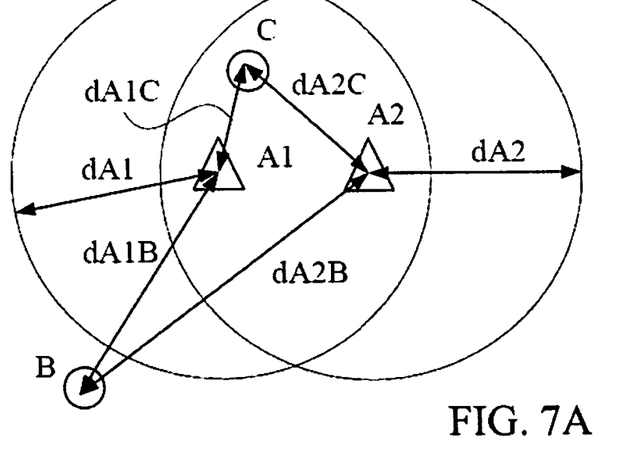

FIG. 7A illustrates an inter-device distance event involving two reference devices A1 and A2, and two monitored devices B and C. It is illustrated that the monitored device C is positioned within the reference distance limit dA1 and dA2 of A1 and A2, respectively. Distance dA1C is consequently shorter then dA1 and distance dA2C is shorter than dA2. In addition, it is illustrated that the monitored device B is positioned beyond both reference distance limits dA1 and dA2 of A1 and A2, respectively.

Since monitored device B is beyond not only one but both reference distances dA1 and dA2 the criterion of inter-device distance event "any beyond distance" is fulfilled. It is namely a requirement for any one of the monitored devices to be located beyond all reference distances to fulfill the distance-related event criteria "any beyond distance".

The monitored device C is located within both reference distances dA1 and dA2. Since at least one of the monitored devices is located within at least one of the reference distances, the inter-device distance event criterion "any within distance" is also fulfilled, at the same time.

If the monitored device B and C are traveled beyond the distance limit of all respective reference devices, the inter-device distance criteria "all beyond distance" would be fulfilled.

Moreover, if the device B and C are traveled within the distance limit of at least one reference device, the inter-device distance criteria "all within distance" would be fulfilled.

Figure 7B:
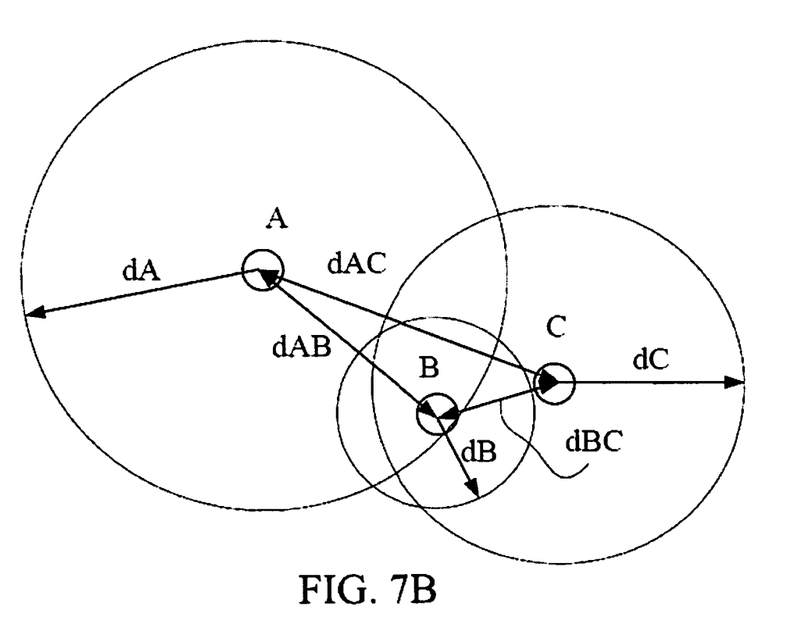

FIG. 7B illustrates a situation where there are three monitored devices A, B and C, but no defined reference devices. In this situation, the pair-wise distances dAB, dAC and dBC are determined, whereafter these are related to distance limits associated with respective monitored device, dA, dB and dC. It is shown that the monitored device B is within dA and dC, whereas A is beyond dB and dC, and C is beyond dA and dB. For this reason this inter-device distance event fulfils the criterion for "any within distance", since monitored device B is within dA and dC, as well as the criterion for "any beyond distance", since monitored device A and C are beyond the distance limits as noted above.

One example of an application in absence of a reference device is to provide a notification in case the distance between two friends is less than a specified distance that can be set when requesting the notification.

In absence of reference devices, distances between all terminal devices are measured and for each measured distance there is a distance limit for the evaluation of the distance event criteria.

Finally, it can be mentioned that inter-device distance events may thus involve situations with one reference device and one monitored device, one reference device and more than one monitored devices, many reference devices and one monitored device, many reference devices and more than one monitored devices, or situations in which all devices are monitored devices.

Figure 8:
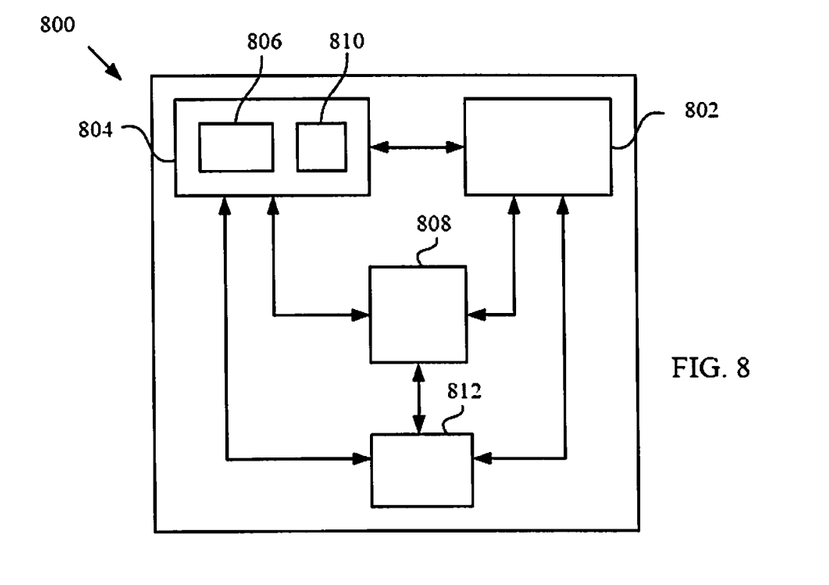
FIG. 8 illustrates a Location based gateway according to some embodiments of the present invention.

In the following a schematic presentation of a few service-related nodes according to some embodiments of the present invention will be presented. FIG. 8 illustrates a schematic overview of a first service-related node in the form of a Location-based gateway 800. The Location-based gateway may comprise a transceiving unit 802, a processing unit 804, a triggering unit 808 and a control unit 812. The processing unit 804 may comprise a monitoring unit 806 and an evaluating unit 810, according to some embodiments of the present invention.

The transceiving unit 802 may be conFigured to receive a request for a deferred distance notification for at least two user devices from an Application node 102, 202, 900. The request may comprise user device identification data for the user devices and a plurality of user device distance-related event criteria of the user devices.

The transceiving unit 802 can further be conFigured to send to a Location Enabler 106, 206, 1000 a request for the location of the user devices, and to receive from the Location Enabler 106, 206, 1000 location data of the user devices.

The processing unit 804 is conFigured to be connected to the transceiving unit 802, may comprise an evaluating unit 810 that is conFigured to evaluate the user device locations with respect to the user device distance-related event criteria, and a monitoring unit 806 that is conFigured to monitor the fulfillment of user device distance-related event criteria. A triggering unit 808 may further be arranged to trigger a distance notification upon detected fulfillment by the monitoring unit 806. The distance notification is then sent by the transceiving unit 802 to the Application node 102, 202, 900.

In addition, the transceiving unit 802 is also conFigured to receive a distance notification acknowledgement S-228 from the Application node 102, 302. It is also conFigured to receive an end distance notification request in step S-230 and to forward the request to the Location Enabler by sending an end periodical location request in step S-232, to receive a response in step S-234 end periodical location response and t forward the response to the Application node by sending an end distance notification response in step S-236. Proper management of the transaction IDs, ID A and ID B, is needed to connect an in-coming request to an out-going request and an in-coming response to an out-going response in the Location-based gateway.

It should be noted that the steps of the Location-based gateway can be controlled by the control unit 812.

Figure 9:
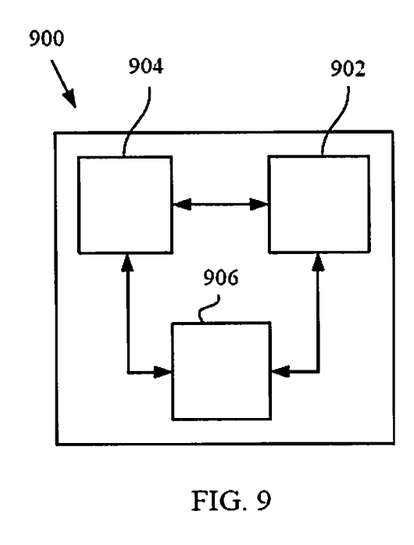
FIGS. 9 and 10 illustrate an Application node and a Location enabler, respectively, according to some embodiments of the present invention.
Figure 10:
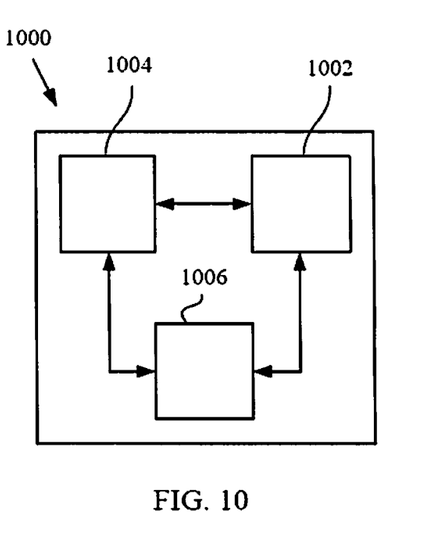

FIGS. 9 and 10, each illustrates a schematic overview of a second and a third service-related node, in the form of an Application Node 900 and a Location Enabler 1000, respectively, according to some embodiments of the present invention. The Application node 900 can comprise a transceiving unit 902, a processing unit 904 and a control unit 906.

The a transceiving unit 902 can be conFigured to send to the request for a deferred distance notification for the user devices to the first service-related node 104, 204, 800, where the request comprises user device identification data for the user devices. The transceiving unit 902 may also be conFigured to receive from the Location-based gateway 104, 204, 800 the deferred distance notification for the user devices, when a user device distance-related event criterion is fulfilled. The processing unit 904 can be connected to the transceiving unit 902 and be conFigured to initialize the request for the deferred distance notification for step S-210 and to initialize a request to end the deferred distance notification for step S-230.

The Location enabler 1000 may comprise a transceiving unit 1002, a location obtaining unit 1004 and a control unit 1006. The transceiving unit 1002 can be conFigured to receive the request for the location of the user devices, and the location obtaining unit 1004 can be connected to the transceiving unit 1002, and be conFigured to obtain the location of the devices. The transceiving unit 1002 can furthermore be conFigured to send to the Location-based gateway 104, 204, 800 the location data of the user devices as obtained from the location obtaining unit 1004. It should be mentioned that the request for location may comprise a periodical location request. The location obtaining unit 1004 may be conFigured to obtain periodical location data for the user devices and forward the data to the transceiving unit 1002.

Leaving the explicit description of the nodes and returning to the location request the following can be mentioned.

A Location Deferred Request (LDR) can be defined as a location request where the location response is required after a specific event related criterion, as specified by the location request, is fulfilled. When the criterion is fulfilled as determined from reported distances, the event accordingly occurs. The event may thus occur upon receipt of a location report. However, upon set up, a distance-related event criterion may already be fulfilled before a regular location report has been received from the location enabler. In this case, an event can be considered to occur immediately.

At least some embodiments of the invention introduce an event type for LDRs which concern entered inter-device distance constellations. As for an already set up notification service, it is thus the fulfillment of event related criteria that can be detected. LSC can thus be notified when an event criterion is fulfilled.

Since distance notifications can be provided, it is straight forward by using the embodiments of the present invention, to achieve a distance-aware service to users. Users will appreciate services that need to take fast and appropriate actions depending on the geographical relation between groups of users. Alert services, rescue services, friend-finder services, gaming services are merely a fraction of the vast number of services that will benefit from the embodiments of the present invention.

Location Deferred Request Information

Below will be presented information and parameters that can be comprised in a Location Deferred Request (LDR).

Reference Devices or UE Identities

A referenced UE identity is a UE, may be regarded as the center of the monitored circular area that can assist defining within or beyond the distance limit of the referenced UE. A referenced UE identity can be expressed by a verinym or a pseudonym.

If only one referenced UE identity is specified, there is hence only one monitored area.

If several referenced UE identities are specified, each UE may act as a center point of its own monitored area.

If no explicit referenced UE identity is provided, all monitored UE identities will also be considered as referenced UE identities.

Monitored Devices or UE Identities

A monitored device or UE identity is a device or UE, which can be within or beyond a distance to any referenced UE identity. A monitored UE identity can be expressed by a verinym or a pseudonym.

If the same UE identity is provided both as a referenced and a monitored UE identity, it will not be considered to be within or beyond its own distance. However, it can still trigger an event due to another referenced UE identity.

LSC Client Identity

The Location Service (LSC) Client identity defines the service or client that requests the Location Deferred Request (LDR). This will usually be the identity of a location based client or application.

Event Criterion

Distance-related event criteria can thus trigger deferred response notification. When the relationship between a referenced UE identity and a monitored UE identity fulfills the specified distance-related event criterion, a notification, sent as an asynchronous response, can be sent to the LSC Client. A brief summary of earlier stated criteria comprises:

"All Within Distance": A notification is sent when all monitored UE identities have entered within the distance to at least one referenced UE identity.

"Any within Distance": A notification is sent when at least one monitored UE identity is within the distance to at least one referenced UE identity.

"All Beyond Distance": A notification is sent when all monitored UE identities are beyond the distance to all referenced UE identities.

"Any beyond Distance": A notification is sent when at least one monitored UE identity is beyond the distance to all referenced UE identities.

Event Notification Information

A distance notification comprises a transaction ID to enable correlating the distance notification with the pertinent request as initiated the distance notification. The distance notification typically also comprises location information of the user device or devices that that triggered the distance notification event. In addition, the distance notification may also comprise the distance between user devices and reference devices between which the distance triggered the distance notification. The distance notification may thus also comprise the distance from one device to one or more friends, colleagues or relatives, to mention some examples. The distance notification may also comprise the actual distance-related event criteria, as such.

LDR Reference Identity or Transaction Identity

The LDR reference identity must be able to identify a unique request, either on its own or together with other identifiers. An example is that the LDR reference identity together with the LSC identity can point out a unique request.

The LDR reference identity can be provided together with the request, when being generated by the LSC Client, or be provided in a synchronous response, when being generated by the LSC.

The LDR reference identity is provided back to the LCS Client in notification reports. It is also provided in an eventual notification telling the request has ended or has been terminated in the LCS.

Active Request Time

This information can be used to specify an active time window for the distance notification request. Some examples how to specify the lifetime may be:

A start and stop time.
A stop time, when the request is immediately activated.
A start time and a relative duration.
A relative duration. In this case the request is immediately activated.

If no life-time information is specified, the request will be valid until it is ended or terminated due to other causes.

When the life-time of the request has been exceeded, the LCS may send a notification end message to the LCS with a reason why the request was ended.

Number of Notification Reports

A positive integer may be used to indicate how many triggered notifications reports the LSC Client wants to receive. If no value is specified in the request, unlimited reports are requested. A value of zero may also be used to denote unlimited reports.

When the number of reports has been delivered, the LCS may send a notification end message to the LCS with a reason why the request was ended.

Frequency

If several triggered notifications have been requested, this will define the minimum interval between two sequential notifications.

Requested Quality of Service

This Information may be used to request a specific QoS. This could be for example accuracy, response time and LCS QoS Class. For example, a tracking accuracy will determine how fine grained the determination of a UE identity's location is. A tracking accuracy with a high value, which means coarse grained tracking, may result in more or less notifications in the form of false notifications or missed notifications, than actual real events.

Priority

This may be used to indicate the priority of a particular LDR.

Check Immediate

This information may be used to force an immediate determine whether the event criterion is fulfilled or not. The current locations of the user device or UE identities will be fetched to determine the distances between monitored user devices or UE identities and referenced user devices or UE identities. If the specified criterion is fulfilled an asynchronous notification will be sent to the LSC Client.

Service Policies

A LDR may preferably follow certain service policies of which some are described below.

Number of UE Identities

The LCS may reject a request due to too many referenced or monitored UE identities based on service policies. The LCS can decide, either to adjust the exceeding request-values to the maximum allowed values, or to reject the request.

Request Life-Time

The life-time of a request can be controlled by a couple of policies. LSC can provide policies to limit the number of reports requested and to limit the maximum life-time duration of a request. These properties can act independently or in a combination. The LCS can decide, either to adjust the exceeding request-values to the maximum allowed values, or to reject the request.

Based on the fact that an LCS Client may omit both life-time information and number of report, a LCS may have a policy that will reject any request with unlimited life-time.

Number of Requests

The LCS may also implement a policy limiting the number of concurrent request for a specific LCS Client or for the whole system.

Frequency

The LCS may also have a policy to control the maximum allowed frequency. The LCS can decide, either to adjust the exceeding request-values to the maximum allowed values, or to reject the request.

Quality of Service

All provided QoS information may also be govern by LCS policies. The LCS can decide, either to adjust the exceeding request-values to the maximum allowed values, or to reject the request.

Allow Distance Notifications

The LCS may also have a policy to allow or disallow distance notification. In case distance notifications are not allowed or not supported, the LCS can reject any distance notification request.

Implementation

The Application service may be implemented by for instance the standardized specification Parlay X. By using this specification certain messages are sent and certain parameters are exchanged. In Table 1, messages and parameters for a Start Distance Notification Request being an example of an input message are presented. From Table 1 it is seen that there is no requirement of having a reference device. The upper limit of the number of reference devices is however unbounded. Likewise, at least one monitored device is required.

In addition, the reference device parameter, as well as the duration parameter and the count parameter are optional, and may thus be omitted. The remaining parameters in Table 1 are thus required in a start distance notification request.

TABLE 1

Overview of messages and parameters in a Start Distance Notification Request of a Parlay X implementation

| Part name | Part type | Description |
| --- | --- | --- |
| ReferenceAddresses | xsd:anyURI [0 ... unbounded] | If specified, indicates address of each device that will be used as reference devices from which the distances towards monitored devices indicated in the Addresses will be monitored. |
| MonitoredAddresses | xsd:anyURI [1 ... unbounded] | Contains addresses of devices to monitor. If the ReferenceAddress is specified, then the distance between each monitored device and reference device(s) will be monitored. If the ReferenceAddress is not present, then the distance |

TABLE 1-continued

Overview of messages and parameters in a Start Distance Notification Request of a Parlay X implementation

| Part name | Part type | Description |
|---|---|---|
| | | between each of the monitored devices will be monitored. Note that in that case there must be at least two addresses specified here. |
| Distance | xsd:float | Distance between devices that shall be monitored |
| TrackingAccuracy | xsd:float | Number of meters of acceptable error in tracking distance. |
| Criteria | DistanceCriteria | Indicates when the notification should occur. |
| Frequency | common:TimeMetric | Maximum frequency of notifications (can also be considered minimum time between notifications) |
| Duration | common:TimeMetric | Period of time notifications are provided for. If set to "0" (zero), a default duration time, which is specified by the service policy, will be used. If the parameter is omitted, the notifications will continue until the maximum duration time, which is specified by the service policy, unless the notifications are stopped by endNotificationRequest. |
| Count | xsd:int | Maximum number of notifications. For unlimited number of notifications, either do not specify this part or specify a value of zero. |

TABLE 2

Overview of messages and parameters in a Distance Notification of a Parlay X implementation

| Part name | Part type | Description |
|---|---|---|
| Correlator | xsd:string | Correlator provided in request to set up this notification |
| Data | LocationData [1 . . . unbounded] | Location information for terminals |
| Criteria | DistanceCriteria | Indicates criteria that triggered the notification. For example whether all monitored terminal devices are within a specified distance, or all the devices are beyond the distance. |

The correlator and the data are here compulsory, whereas the criteria can be optionally included in the distance notification itself. The correlator serves as a transaction ID to correlate the distance notification with the distance notification request.

The embodiments of the present invention thus described circumvent the disadvantage of existing services being limited to services that are based on the location of the terminal.

It is an advantage that distance based notification can now be provided to a user by which the user can receive information how far it is to one or more friends, colleagues or relatives. Likewise a user can receive appreciated information in the form of a notification informing him that a group of users or friends have passed a border by either approaching or leaving a referenced user or friend. It is also advantageous that a distance-aware service can now be achieved, with which users will appreciate fast and appropriate actions depending on the geographical relation between groups of the users, the services comprising alert services, rescue services, friend-finder services, gaming services, and the like.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a first service-related node for providing a deferred distance notification for at least two user devices, said method comprising the steps of:

receiving from a second service-related node, a request for a deferred distance notification for the at least two user devices, wherein the request comprises user device identification data for the at least two user devices and a plurality of distance-related event criteria for the at least two user devices;

sending to a third service-related node, a request for the location of the at least two user devices;

receiving from the third service-related node, location data of the at least two user devices;

determining geographical distances between the at least two user devices or between each user device and a reference device based on the location data of the at least two user devices and a known location of the reference device;

monitoring fulfillment of the plurality of distance-related event criteria for the at least two user devices based on the determined geographical distances between the at least two user devices or between each user device and a reference device, wherein the distance-related event criteria include:
 (a) the geographical distance between at least one of the user devices and the reference device is less than a first defined geographical distance;
 (b) the geographical distance between at least one of the user devices and the reference device is greater than the first defined geographical distance;
 (c) the geographical distance between any two user devices of a plurality of user devices is less than a second defined geographical distance; and
 (d) the geographical distance between any two user devices of the plurality of user devices is greater than the second defined geographical distance;

triggering the deferred distance notification when an event criterion of the plurality of distance-related event criteria is fulfilled; and sending the triggered deferred distance notification of the user device distance event to the second service node.

2. The method according to claim 1, further comprising evaluating the received location data of the at least two user devices with respect to the user device distance-related event criteria.

3. The method according to claim 1, wherein the request for the location of the at least two user devices is a request for periodic location of the at least two user devices, and wherein the step of receiving location data comprises periodically receiving the location data of the at least two user devices.

4. A first service-related node for providing a deferred distance notification for at least two user devices, where the first service-related node is in communication with a second service-related node, and comprises:
   a transceiving unit configured to receive a request for a deferred distance notification for the at least two user devices from a second service-related node, wherein the request comprises user device identification data for the at least two user devices and a plurality of distance-related event criteria for the at least two user devices, the transceiving unit also configured to send to a third service-related node, a request for the location of the at least two user devices, and to receive from the third service-related node, location data of the at least two user devices;
   a processing unit connected to the transceiving unit, configured to:
      determine geographical distances between the at least two user devices or between each user device and a reference device based on the location data of the at least two user devices and a known location of the reference device; and
      monitor fulfillment of the plurality of distance-related event criteria for the at least two user devices based on the determined geographical distances between the at least two user devices or between each user device and a reference device, wherein the distance-related event criteria include:
         (a) the geographical distance between at least one of the user devices and a reference device is less than a first defined geographical distance;
         (b) the geographical distance between at least one of the user devices and the reference device is greater than the first defined geographical distance;
         (c) the geographical distance between any two user devices of a plurality of user devices is less than a second defined geographical distance; and
         (d) the geographical distance between any two user devices of the plurality of user devices is greater than the second defined geographical distance; and
      a triggering unit connected to the processing unit and the transceiving unit, configured to trigger the deferred distance notification when an event criterion of the plurality of distance-related event criteria is fulfilled;
   wherein the transceiving unit is also configured to send the triggered deferred distance notification to the second service node.

5. The first service-related node according to claim 4, wherein the processing unit is configured to evaluate the received location data of the at least two user devices with respect to the user device distance-related event criteria.

6. The first service-related node according to claim 4, wherein the transceiving unit is configured to periodically send the request for the location of the at least two user devices, and to periodically receive the location data of the at least two user devices.

* * * * *